United States Patent [19]

Presswood et al.

[11] Patent Number: 4,786,656
[45] Date of Patent: Nov. 22, 1988

[54] POLYHYDROXYALKANE/AROMATIC DIAMINE CHAIN EXTENDERS

[75] Inventors: J. Kenneth Presswood; James H. Simon; Christopher J. Nalepa, all of Baton Rouge, La.

[73] Assignee: Ethyl Corporation, Richmond, Va.

[21] Appl. No.: 158,836

[22] Filed: Feb. 22, 1988

[51] Int. Cl.⁴ .............................................. C08G 18/32
[52] U.S. Cl. .................................... 521/159; 521/163; 528/64; 528/85; 252/182.17; 252/182.26
[58] Field of Search ................. 521/159, 163; 528/64, 528/85; 252/182.17, 182.26

[56] References Cited

U.S. PATENT DOCUMENTS

| | | | |
|---|---|---|---|
| 4,146,688 | 3/1979 | Schwindt et al. | 521/159 |
| 4,296,212 | 10/1981 | Ewen et al. | 521/163 |
| 4,523,004 | 6/1985 | Lin et al. | 528/76 |
| 4,530,941 | 7/1985 | Turner et al. | 521/176 |
| 4,595,742 | 6/1986 | Nalepa et al. | 528/64 |
| 4,659,747 | 4/1987 | Alberino et al. | 521/159 |

Primary Examiner—Maurice J. Welsh
Attorney, Agent, or Firm—Patricia J. Hogan

[57] ABSTRACT

Blends of 90–99 mol % of a polyhydroxyalkane containing 2–6 carbons and 2–3 hydroxyl groups and 1–10 mol % of an aromatic diamine having a pKb value greater than 11.3 are useful as chain extenders for polyurethanes derived from diphenylmethanediisocyanate (MDI) prepolymers. Their use overcomes the sensitivity to stoichiometry common to MDI prepolymer/polyhydroxyalkane systems and leads to the formation of cast elastomers having better green strength and a shorter demold time. The preferred blends are blends of 1,4-butanediol and di(alkylthio)toluenediamines.

24 Claims, No Drawings

POLYHYDROXYALKANE/AROMATIC DIAMINE CHAIN EXTENDERS

FIELD OF THE INVENTION

This invention relates to polyhydroxyalkane/aromatic diamine blends and more particularly to such blends which are useful as chain extenders for polyurethanes derived from diphenylmethanediisocyanate (MDI) prepolymers.

BACKGROUND

It is known that MDI prepolymers are useful in preparing cast polyurethane elastomers and that the chain extenders commonly employed with them are polyhydroxyalkanes, such as 1,4-butanediol. However, there are disadvantages to the MDI prepolymer/polyhydroxyalkane systems, e.g., their being so sensitive to stoichiometry that the components have to be used in almost exactly stoichiometric amounts, their sensitivity to processing temperatures, their inability to tolerate more than a very low moisture content, their requirement for long mold times, and the poor green strength of objects molded from them. It would be desirable to have an MDI prepolymer/chain extender system which does not suffer those disadvantages.

U.S. Pat. Nos. 4,296,212 (Ewen et al.), 4,523,004 (Lin et al.), 4,530,941 (Turner et al.), and 4,659,747 (Alberino et al.) teach diol/diamine mixtures which can be used as chain extenders in RIM processes. U.S. Pat. No. 4,146,688 (Schwindt et al.) teaches the optional use of a minor amount of a diol or triol with certain thio group-containing aromatic diamine chain extenders in the preparation of polyurethanes. U.S. Pat. No. 4,595,742 (Nalepa et al.) discloses poly(alkylthio)aromatic diamine chain extenders having at least two alkylthio substituents on the same ring as at least one of the amino substituents.

SUMMARY OF INVENTION

An object of this invention is to provide a novel chain extender for use with MDI prepolymers in preparing cast polyurethane elastomers.

Another object is to provide such a chain extender which overcomes the sensitivity to stoichiometry common to MDI prepolymer/polyhydroxyalkane systems.

A further object is to provide MDI prepolymer-derived cast elastomers having better green strength and a shorter demold time than elastomers derived from MDI prepolymer/polyhydroxyalkane systems.

These and other objects are attained by the provision of (A) a chain extender comprising 90–99 mol % of a polyhydroxyalkane containing 2–6 carbons and 2–3 hydroxyl groups and 1–10 mol % of an aromatic diamine having a pKb value greater than 11.3 and (B) cast elastomers derived from the chain extender and a diphenylmethanediisocyanate prepolymer.

DETAILED DESCRIPTION

Polyhydroxyalkanes which may be utilized in the practice of the invention are polyhydroxyalkanes containing 2–6 carbons and 2–3 hydroxyl groups. Exemplary of such compounds are ethylene glycol, the 1,2- and 1,3-propylene glycols, the 1,4-, 1,2-, and 2,3-butanediols, 1,5-pentanediol, neopentyl glycol, 1,6-hexanediol, glycerol, 1,2,4-butanetriol, 1,2,6-hexanetriol, etc., and mixtures thereof. The preferred polyhydroxyalkane is 1,4-butanediol.

The aromatic diamine which is used in conjunction with the polyhydroxyalkane is an aromatic diamine having a pKb value greater than 11.3. It is critical that the aromatic diamine have such a pKb value, because aromatic diamines having lower pKb values (e.g., diethyltoluenediamines, mono(methylthio)toluenediamines, etc.) are not operable in achieving the objectives of the invention. Any aromatic diamine having a suitable pKb value may be used, one of the best known of which is methylenebis(2-chloroaniline). However, the preferred aromatic diamines are the poly(alkylthio)aromatic diamines of Nalepa et al., the teachings of which are incorporated herein in toto by reference. Such compounds are poly(alkylthio)aromatic diamines having at least two alkylthio substituents on the same ring as at least one of the amino substituents, the alkylthio groups preferably containing 1–20, more preferably 1–6, carbons. Any of these diamines can be used in the practice of the invention, but the preferred ones are tri(methylthio)-m-phenylenediamine and the di(alkylthio)toluenediamines, such as 3,5-di(methylthio)-2,4-diaminotoluene, 3,5-di(methylthio)-2,6-diaminotoluene, 3,5-di(ethylthio)-2,4-diaminotoluene, 3,5-di(ethylthio)-2,6-diaminotoluene, etc., and mixtures thereof.

The polyhydroxyalkane and aromatic diamine are used in proportions such that the aromatic diamine constitutes 1–10 mol %, preferably 5–10 mol %, of the total chain extender. They may be combined with the diphenylmethanediisocyanate prepolymer in separate streams but are preferably blended with one another before being mixed with the prepolymer, usually at a temperature of about 50°–100° C., preferably about 90° C. Regardless of whether they are preblended or not, they are generally mixed with the prepolymer in such amounts that the reaction mixture contains 0.8–1.2, preferably 0.95–1.05, equivalents of chain extender per equivalent of prepolymer. It is surprising that there is so much latitude in the amount of chain extender that can be reacted with the prepolymer. As mentioned above, there is very little permissible latitude in the amount of chain extender that can be used in a diphenylmethanediisocyanate prepolymer/polyhydroxyalkane system, since such systems are very sensitive to stoichiometry.

The diphenylmethanediisocyanate prepolymers that are reacted with the chain extenders of the invention are known materials which are prepared by reacting 4,4'-diphenylmethanediisocyanate and/or 2,4'-diphenylmethanediisocyanate, or a liquefied diphenylmethanediisocyanate, with a polyester polyol or polyether polyol, such as the polyols taught in Nalepa et al. In a preferred embodiment of the invention, the polyol is a polyether polyol, especially a polytetramethylene ether glycol. It is also preferred that the prepolymer have a free —NCO content of about 4–12% by weight.

As in the preparation of other cast polyurethane elastomers, the polyurethanes of the present invention are prepared by casting a mixture of the prepolymer, the chain extender, and any optional ingredients into a suitable mold, curing the reaction mixture in the mold to form a polyurethane, and removing the polyurethane from the mold. Casting temperatures of about 100°–110° C. and curing temperatures of about 90°–110° C. are particularly suitable. Optional ingredients that may be employed include conventional additives, such as blowing agents, flame retardants, emulsifiers, pigments, dyes, mold release agents, foam stabilizers, fillers, etc.

The invention is advantageous in that the MDI prepolymer/polyhydroxyalkane/aromatic diamine systems are less sensitive to stoichiometry and to water than the known MDI prepolymer/polyhydroxyalkane systems, and they lead to the formation of cast elastomers having better green strength, thus permitting shorter demold times (e.g., 20–60 minutes) and improving the productivity per mold. Also, the polyurethanes formed from the novel systems have lower resilience—an advantage in applications such as printing rolls.

The following examples are given to illustrate the invention and are not intended as a limitation thereof.

EXAMPLE I

A blend of (A) 95 mol % of 1,4-butanediol containing 0.15 mol % of water (three times higher than the maximum water content recommended for a butanediol chain extender) and (B) 5 mol % of DMTDA (a mixture of 3,5-di(methylthio)-2,4-diaminotoluene and 3,5-di(methylthio)-2,6-diaminotoluene having a pKb value of 11.6) was preheated to 50° C. and mixed with three aliquots of a preheated (93° C.) commercial diphenylmethanediisocyanate/polytetramethylene ether glycol prepolymer having a nominal free —NCO content of 6.4% to form reaction mixtures wherein the chain extender/isocyanate equivalent ratios were 0.85, 0.95, and 1.05, respectively. Each of the reaction mixtures was cast into a mold at 110° C., demolded after one hour, and further post-cured at 100° C. for 18 hours. The test pieces were aged for one week at 24° C. and 50% relative humidity prior to testing for:

| Property | ASTM Test |
| --- | --- |
| Hardness A | D-676 |
| Tensile | D-412 |
| M-100% | D-412 |
| M-300% | D-412 |
| Elongation | D-412 |
| Die C Tear | D-624 |
| Split Tear | D-470 |
| Compression Set | D-395 B |
| Bashore Rebound | D-2632 |

The results of these tests are shown in Table I together with the pot lives, which were measured with a Brookfield viscometer prior to molding, and the demold strengths, which were measured directly after demold by the ASTM D-624 Die C Tear Test.

TABLE I

| Equivalent Ratio | 0.85 | 0.95 | 1.05 |
| --- | --- | --- | --- |
| Pot Life (min) | 4.5 | 4.5 | 4.5 |
| Demold Strength (pli) | 153 | 248 | 251 |
| Hardness A | 80 | 81 | 81 |
| Tensile (psi) | 2630 | 3980 | 6090 |
| M-100% (psi) | 455 | 510 | 450 |
| M-300% (psi) | 2100 | 1830 | 1310 |
| Elongation (%) | 310 | 380 | 500 |
| Die C Tear (pli) | 180 | 220 | 300 |
| Split Tear (pli) | 21 | 33 | 72 |
| Compression Set (%) | 9 | 9 | 22 |
| Bashore Rebound (%) | 50 | 51 | 52 |

EXAMPLE II

Example I was essentially repeated except that the chain extender used was a blend of 90 mol % of the 1,4-butanediol and 10 mol % of DMTDA. The results are shown in Table II.

TABLE II

| Equivalent Ratio | 0.85 | 0.95 | 1.05 |
| --- | --- | --- | --- |
| Pot Life (min) | 3 | 3 | 3 |
| Demold Strength (pli) | 193 | 271 | 270 |
| Hardness A | 82 | 83 | 83 |
| Tensile (psi) | 5900 | 5580 | 5950 |
| M-100% (psi) | 725 | 755 | 750 |
| M-300% (psi) | 2140 | 1870 | 1440 |
| Elongation (%) | 385 | 430 | 580 |
| Die C Tear (pli) | 230 | 260 | 350 |
| Split Tear (pli) | 28 | 39 | 97 |
| Compression Set (%) | 10 | 10 | 41 |
| Bashore Rebound (%) | 48 | 50 | 50 |

COMPARATIVE EXAMPLE A

Example I was essentially repeated except that 1,4-butanediol having a water content of 0.05 mol % was used as the sole chain extender. The results are shown in Table III.

TABLE III

| Equivalent Ratio | 0.85 | 0.95 | 1.05 |
| --- | --- | --- | --- |
| Pot Life (min) | 8 | 8 | 8 |
| Demold Strength (pli) | 117 | 141 | 118 |
| Hardness A | 84 | 83 | 85 |
| Tensile (psi) | 4940 | 5240 | 5490 |
| M-100% (psi) | 745 | 705 | 770 |
| M-300% (psi) | 2150 | 1470 | 1830 |
| Elongation (%) | 445 | 710 | 555 |
| Die C Tear (pli) | 250 | 355 | 280 |
| Split Tear (pli) | 28 | 89 | 45 |
| Compression Set (%) | 11 | 30 | 12 |
| Bashore Rebound (%) | 54 | 60 | 62 |

COMPARATIVE EXAMPLE B

Following the same general procedure as in the preceding examples, 0.95 equivalent proportion of 1,4-butanediol was mixed with one equivalent proportion of the prepolymer to form a reaction mixture having a water content of 0.02 mol %; and the reaction mixture was cast, molded, post-cured, and tested. The results are shown below.

| Pot Life (min) | 8 |
| --- | --- |
| Demold Strength (pli) | 219 |
| Hardness A | 85 |
| Tensile (psi) | 6320 |
| M-100% (psi) | 730 |
| M-300% (psi) | 1770 |
| Elongation (%) | 480 |
| Die C Tear (pli) | 375 |
| Split Tear (pli) | 55 |
| Compression Set (%) | 20 |
| Bashore Rebound (%) | 64 |

COMPARATIVE EXAMPLE C

Following the same general procedure as in the preceding examples, 0.95 equivalent proportion of 95 mol % of the 1,4-butanediol of Comparative Example B and 5 mol % of mono(methylthio)toluenediamine having a pKb value of 10.7 was mixed with one equivalent proportion of the prepolymer; and the reaction mixture was cast, molded, postcured, and tested. The results are shown below.

| Pot Life (min) | 3.7 |
| --- | --- |

-continued

| | |
|---|---|
| Demold Strength (pli) | 177 |
| Hardness A | 84 |
| Tensile (psi) | 2060 |
| M-100% (psi) | 640 |
| M-300% (psi) | 1510 |
| Elongation (%) | 350 |
| Die C Tear (pli) | 290 |
| Split Tear (pli) | 39 |
| Compression Set (%) | 19 |
| Bashore Rebound (%) | 62 |

EXAMPLE III

A series of polyurethanes was prepared by repeating Comparative Example C except for substituting the following aromatic diamines for the mono(methylthio)-toluenediamine:

| Aromatic Diamine | | pKb Value |
|---|---|---|
| DMTDA | | 11.6 |
| DETTDA | a mixture of 3,5-di(ethylthio)-2,4-diaminotoluene and 3,5-di(ethylthio)-2,6-diaminotoluene | 11.7 |
| DPTDA | a mixture of 3,5-di(propylthio)-2,4-diaminotoluene and 3,5-di(propylthio)-2,6-diaminotoluene | 11.9 |
| TMMPDA | tri(methylthio)-m-phenylenediamine | 12.9 |
| MBOCA | methylenebis(2-chloroaniline) | 11.9 |

The results are shown in Table IV.

TABLE IV

| Aromatic Diamine | DMTDA | DETTDA | DPTDA | TMMPDA | MBOCA |
|---|---|---|---|---|---|
| Pot Life (min) | 4.5 | 4.2 | 5.3 | 4.3 | 4.8 |
| Demold Strength (pli) | 329 | 312 | 305 | 323 | 310 |
| Hardness A | 84 | 84 | 84 | 85 | 85 |
| Tensile (psi) | 5760 | 5380 | 3770 | 6380 | 3410 |
| M-100% (psi) | 580 | 670 | 760 | 640 | 730 |
| M-300% (psi) | 1600 | 1650 | 1980 | 1650 | 1850 |
| Elongation (%) | 440 | 460 | 410 | 480 | 385 |
| Die C Tear (pli) | 315 | 335 | 300 | 360 | 325 |
| Split Tear (pli) | 44 | 51 | 35 | 48 | 51 |
| Compression Set (%) | 17 | 25 | 16 | 21 | 19 |
| Bashore Rebound (%) | 60 | 60 | 61 | 61 | 61 |

It is obvious that many variations can be made in the products and processes set forth above without departing from the spirit and scope of this invention.

What is claimed is:

1. A blend of 90–99 mol % of a polyhydroxyalkane containing 2–6 carbons and 2–3 hydroxyl groups and 1–10 mol % of an aromatic diamine having a pKb value greater than 11.3.

2. The blend of claim 1 wherein the polyhydroxyalkane is 1,4-butanediol.

3. The blend of claim 1 wherein the aromatic diamine is a poly(alkylthio)aromatic diamine having at least two alkylthio substituents on the same ring as at least one of the amino substituents.

4. The blend of claim 3 wherein the aromatic diamine is a di(alkylthio)toluenediamine.

5. The blend of claim 4 wherein the di(alkylthio)-toluenediamine is 3,5-di(methylthio)-2,4-diaminotoluene.

6. The blend of claim 4 wherein the di(alkylthio)-toluenediamine is 3,5-di(methylthio)-2,6-diaminotoluene.

7. The blend of claim 4 wherein the di(alkylthio)-toluenediamine is a mixture of 3,5-di(methylthio)-2,4-diaminotoluene and 3,5-di(methylthio)-2,6-diaminotoluene.

8. The blend of claim 1 containing 5–10 mol % of the aromatic diamine.

9. The blend of claim 1 containing 90–95 mol % of 1,4-butanediol and 5–10 mol % of a mixture of 3,5-di(methylthio)-2,4-diaminotoluene and 3,5-di(methylthio)-2,6-diaminotoluene.

10. A polyurethane prepared by reacting (A) a chain extender comprising 90–99 mol % of a polyhydroxyalkane containing 2–6 carbons and 2–3 hydroxyl groups and 1–10 mol % of an aromatic diamine having a pKb value greater than 11.3 with (B) a diphenylmethanediisocyanate prepolymer.

11. The polyurethane of claim 10 wherein the polyhydroxyalkane is 1,4-butanediol.

12. The polyurethane of claim 10 wherein the aromatic diamine is a mixture of 3,5-di(methylthio)-2,4-diaminotoluene and 3,5-di(methylthio)-2,6-diaminotoluene.

13. The polyurethane of claim 10 wherein the diphenylmethanediisocyanate component of the prepolymer is 4,4'-diphenylmethanediisocyanate.

14. The polyurethane of claim 10 wherein the diphenylmethanediisocyanate component of the prepolymer is a mixture of 4,4'-diphenylmethanediisocyanate and 2,4'-diphenylmethanediisocyanate.

15. The polyurethane of claim 10 wherein the prepolymer is a diphenylmethanediisocyanate/polyether polyol reaction product.

16. The polyurethane of claim 15 wherein the polyether polyol is a polytetramethylene ether glycol.

17. The polyurethane of claim 10 wherein the prepolymer has a free —NCO content of about 4–12%.

18. The polyurethane of claim 10 wherein the chain extender is employed in an amount such as to provide 0.8–1.2 equivalents of chain extender per free —NCO group.

19. The polyurethane of claim 18 wherein the chain extender is employed in an amount such as to provide 0.95–1.05 equivalents of chain extender per free —NCO group.

20. The polyurethane of claim 10 wherein the polyhydroxyalkane and the aromatic diamine are blended with one another before being mixed with the prepolymer.

21. The polyurethane of claim 10 which is prepared by reacting (A) 0.95–1.05 equivalent proportions of a chain extender blend of 90–95 mol % of 1,4-butanediol and 5–10 mol % of a mixture of 3,5-di(methylthio)-2,4-diaminotoluene and 3,5-di(methylthio)-2,6-diaminotoluene with (B) one equivalent proportion of a diphenylmethanediisocyanate prepolymer having a free —NCO content of about 4–12% by weight and obtained by reacting a diphenylmethanediisocyanate component with a polytetramethylene ether glycol.

22. A process which comprises (A) casting into a mold a reaction mixture of a diphenylmethanediisocyanate prepolymer and a chain extender comprising 90–99 mol % of a polyhydroxyalkane containing 2–6 carbons and 2–3 hydroxyl groups and 1–10 mol % of an aromatic diamine having a pKb value greater than 11.3, (B) curing the reaction mixture in the mold at a temperature of about 90°–110° C. to form a polyurethane, and (C) removing the polyurethane from the mold.

23. The process of claim 22 wherein the reaction mixture comprises 0.8–1.2 equivalent proportions of a blend of 90–95 mol % of 1,4-butanediol and 5–10 mol % of a mixture of 3,5-di(methylthio)-2,4-diaminotoluene and 3,5-di(methylthio)-2,6-diaminotoluene and one equivalent proportion of a diphenylmethanediisocyanate prepolymer having a free —NCO content of about 4–12% by weight and obtained by reacting a diphenylmethanediisocyanate component with a polytetramethylene ether glycol.

24. The process of claim 23 wherein the reaction mixture comprises 0.95–1.05 equivalent proportions of the blend and one equivalent proportion of the prepolymer.

* * * * *